Aug. 2, 1938.  J. L. TORGERSON  2,125,755
SAW FILING MACHINE
Filed June 26, 1936
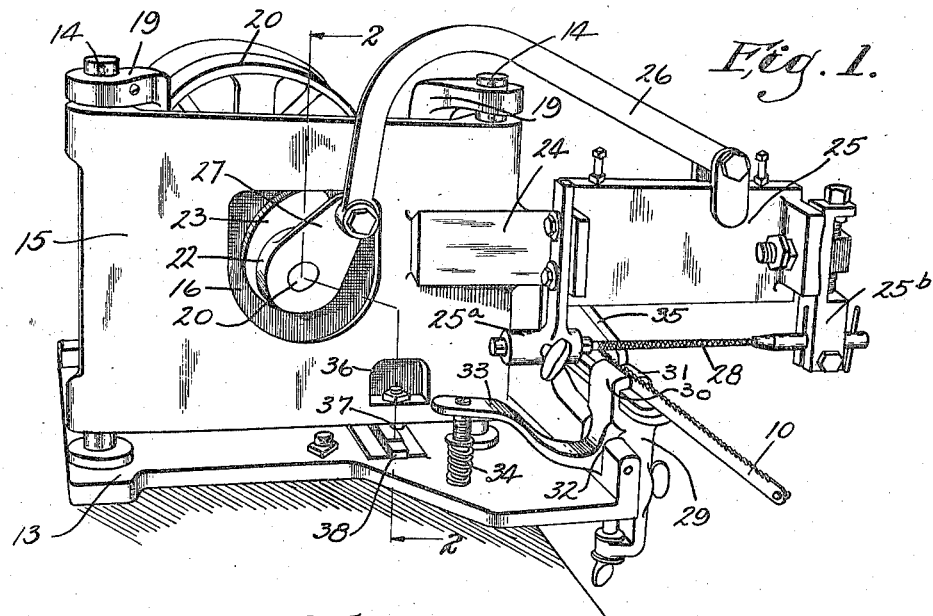
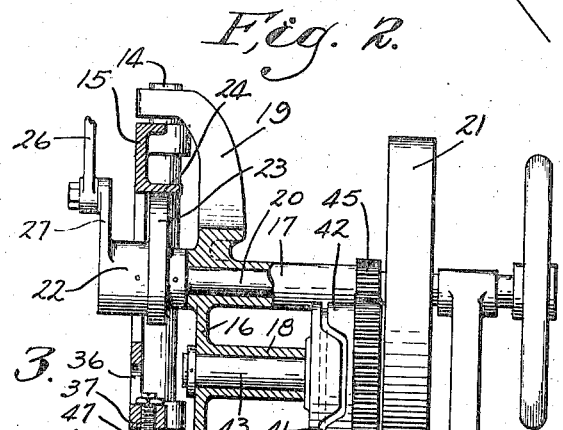
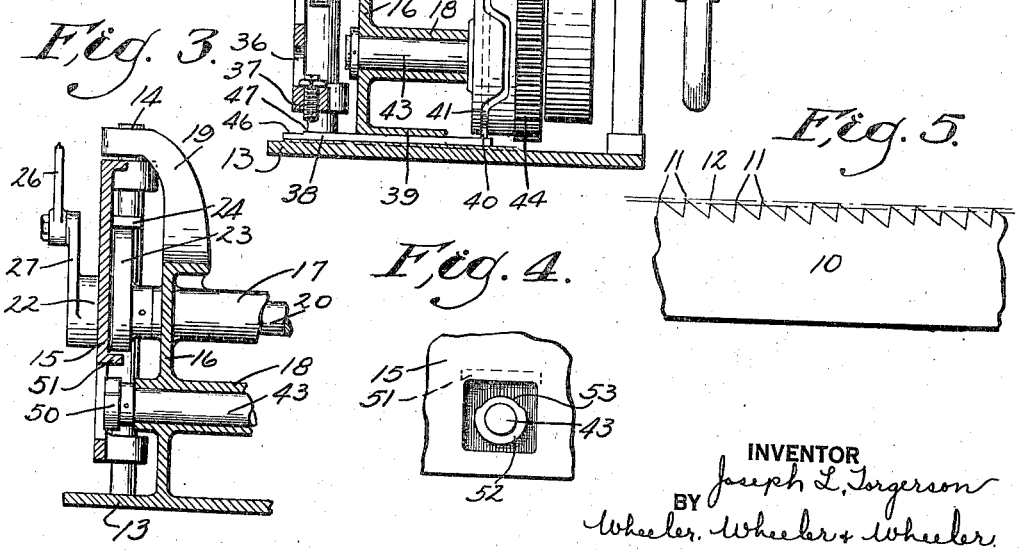
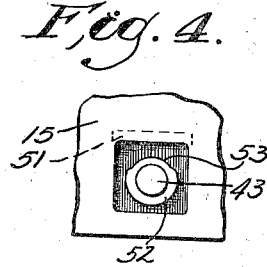
INVENTOR
Joseph L. Torgerson
BY Wheeler, Wheeler & Wheeler
ATTORNEYS Patented Aug. 2, 1938

2,125,755

UNITED STATES PATENT OFFICE 2,125,755

SAW FILING MACHINE

Joseph L. Torgerson, Milwaukee, Wis.

Application June 26, 1936, Serial No. 87,343

6 Claims. (Cl. 76—33)

My invention relates to improvements in saw filing machines.

Many types of saws, whether of the disk, band, or of the straight butcher's saw varieties, have teeth of differing lengths and shapes wherein certain of the teeth perform a cutting operation and others clear the way for cutting operations. These latter teeth are often called drag teeth. In the hand filing and sharpening of saws having teeth of identical characteristics throughout, automatic saw filing devices have heretofore been provided to accomplish the work and comparatively few problems have existed. But in the filing and sharpening of a saw having teeth of differing characteristics, there are presented certain problems which it is the object of my invention to solve. It is the object of my invention therefore to provide an automatic saw filing and sharpening device wherein are provided automatic means for filing and sharpening the large and the small, the high and the low teeth, or the irregular toothed saw.

In the drawing:

Figure 1 is a perspective of my improved saw filing machine and showing a straight butcher's saw blade in position for a sharpening operation.

Figure 2 is a vertical section approximately on line 2—2 of Fig. 1.

Figure 3 is a vertical section similar to Fig. 2, but showing an alternative form of cam stop to accomplish the purposes of my invention.

Figure 4 is an end elevation of the plate and cam of the structure shown in Fig. 3.

Figure 5 is a side elevation of a portion of a saw blade having differing sizes of teeth which may be sharpened automatically upon my improved filing machine.

Like parts are designated by the same reference characters throughout the several views.

As indicated in Figure 5, some saw blades 10 are provided with cutting teeth 11 usually in a series of two or four and an intermediate drag tooth 12 between the series. The drag tooth 12 is a shorter tooth which does not extend into a cutting position. It is merely for the purpose of clearing the dust or cuttings from the cutting teeth and also for the purpose of "relieving" the heavy pull that would be caused by a continuation of the series of cutting teeth.

Heretofore the filing of a saw such as the one shown at 10 required a series of operations including possibly the use of an automatic saw filing machine to be followed by a hand operation in which the teeth 12 were given an additional stroke of the file. I have now, however, provided an automatic machine to accomplish all of the saw filing and sharpening operations required by a saw such as the one shown in Fig. 5 or the action required by any saw, and a series of cutting teeth with intermediate drag teeth or teeth of differing height.

My saw filer includes a bed plate 13 with upstanding posts 14 which provide guideways for a vertically reciprocable plate 15.

The main frame 16 mounted upon the bed plate 13 includes a main bearing sleeve 17 and a jack shaft bearing sleeve 18, and the frame also includes two post braces 19 to steady and support the upper ends of the guideways 14. The main bearing sleeve 17 provides a journal and a main operating shaft 20 upon which is keyed a driving pulley 21 for the reception of a belt, not shown, which is used to drive the machine.

At one end of the main driving shaft 20 is a hub 22, one portion of which comprises a cam 23 which bears on the under side of a cam shelf 24 forming part of the plate 15. The plate 15 is therefore supported for vertical reciprocation under control of the cam 23 as it rotates with the main shaft 20.

As shown clearly in Fig. 1, the plate 15 is provided with a dove-tail slide 24 upon which a file carrier 25 is supported for reciprocation under control of a connecting rod 26 connected to a crank arm 27 formed as part of hub 22. The file carrier has, at either end thereof, a file receiving clamp 25a—25b between which the file 28 is secured so that as the main shaft 20 is rotated by the pulley 21, the plate 15 is alternately raised and permitted to lower again under control of the cam 23, and the file carrier 25 is reciprocated backwardly and forwardly in a cycle which includes a complete traverse of the file in a horizontal stroke at the lowermost position of the plate 15.

In proper position below the file 28, I provide a vise 29 with jaws 30 and 31, jaw 31 being fixed and jaw 30 being pivotally mounted at 32 and provided with a spring arm 33 and acted upon by spring 34 whereby to squeeze the saw blade 10 between the jaws. It is thus clear that with the structure thus far described, a saw blade positioned between the jaws 30 and 31 will be acted upon by the file 28 as each horizontal stroke of the file traverses the particular point upon the blade affected by the file, and, as is customary in saw filing machines, I provide a pawl 35 acted upon by mechanism not shown to progressively advance the saw, tooth by tooth, after each stroke of the file.

It will be noted that at 36 I have cut away a portion of the plate 15 to provide a seat for a stop bolt 37 which extends adjustably through the bottom margin of the plate 15 into position where it can contact my automatically adjustable stop plate 38. This stop plate 38 is mounted in a guide 39 formed as part of the frame 16 and a cam follower 40 comprising an upstanding pin at the inner end of the stop plate 38 is positioned in a cam groove 41 formed in gear hub 42 mounted upon jack shaft 43. The cam hub 42 forms a part of a gear 44 which is meshed with a pinion 45 upon the main drive shaft at 20 so that there is timed relation between the rotation of the main drive shaft 20 and the jack shaft 43 with the result that the cam groove 41 acting upon a cam following pin 40 actuates the stop plate 38 in timed synchronism with the vertical reciprocations of the plate 15.

It will be noted that the stop plate 38, as it is reciprocated by the cam follower 40 in cam groove 41, presents various elevations 46 or 47 under the stop bolt 37. The elevations thus provided determine the lowermost position of the plate 15 for each reciprocation and by proper selection of pinion and gear sizes 45—44 and a proper configuration of the cam groove 41, and a proper gradation of stop surfaces 46, 47 or any additional stop surfaces desired, I provide any selected series or grouping of teeth 11 or 12 in a saw as follows:

Assuming that the file is operated upon one of the longer cutting teeth 11, the cam groove 41 is of such configuration as to place the higher "land" 47 of the stop plate 38 in position under the stop bolt 37 and the stop plate 38 will remain in this position so long as the longer teeth 11 are to be filed. However, when the shorter tooth 12 is to be filed, the cam groove 41 is curved to withdraw the pin 40 and the plate 38 so that the lower "land" 46 of the stop plate 38 is positioned under the stop bolt 37. Any differences in elevation of the lands 46 and 47 on the stop plate may be provided for any type of saw to be filed by my automatic machine.

In the alternative construction shown in Figs. 3 and 4, in my drawing, I accomplish the adjustment of the plate 15 by means of a cam 50 on the extended end of the jack shaft 43 and I shape the plate 15 to provide a shelf 51 to bear upon the cam 50 in the lowermost reciprocation of the plate 15. The lobe 52 of the cam 50 may be shaped according to the series of high teeth and the relieved portion 53 may be of sufficient extent so that the shelf 51 will bear thereon long enough to provide the deep cut teeth 12.

I claim:

1. In a machine for sharpening a saw having teeth of varying characteristics including a saw holder, a drive shaft, a member mounted for reciprocating movement, means connected to said drive shaft for actuating said member, a sharpener slidably connected to said member, means operatively connecting said drive shaft to the sharpener to move the latter across the saw, stop means for controlling the limit of the movement of the reciprocating member in one direction, and means for actuating the stop means so that during the continuous operation of the machine automatically to control the operating position of the sharpener relative to the saw teeth in accordance with the particular characteristics of the tooth being sharpened.

2. In a machine for sharpening a saw having teeth of varying characteristics including a saw holder, a drive shaft, a plate mounted for movement to and from the saw, means on said drive shaft for actuating said plate, a sharpener slidably mounted on said plate, means operatively connecting said shaft to said sharpener to move the latter across the saw, and means movable into the path of the reciprocating plate during the continuous operation of the machine to control the position of the sharpener relative to the saw teeth and to vary the same in accordance with the particular characteristics of the tooth being sharpened.

3. In a machine for sharpening a saw having teeth of varying characteristics including a saw holder, a drive shaft, a plate mounted for substantially vertical movement, means on said drive shaft for actuating said plate, a sharpener slidably mounted on said plate, means operatively connecting said shaft to said sharpener to move the latter across the saw, and a stop having a plurality of stepped surfaces arranged selectively to be moved into the path of the reciprocating plate during the continuous operation of the machine variably and automatically to control the vertical position of the sharpener relative to the saw teeth in accordance with the particular characteristics of the tooth being sharpened.

4. In a machine for sharpening a saw having teeth of varying characteristics including a saw holder, a drive shaft, a plate mounted for substantially vertical movement, means on said drive shaft for actuating said plate, a sharpener slidably mounted on said plate, means operatively connecting said shaft to said sharpener to move the latter across the saw, and a movable stop in synchronized connection with the driving shaft and having a plurality of surfaces of varying depths arranged selectively to be moved into the path of the reciprocating member during the continuous operation of the machine to control the vertical position of the sharpener relative to the saw teeth and to vary the same in accordance with the particular characteristics of the tooth being sharpened.

5. In a machine for sharpening a saw having teeth of variable characteristics including a saw holder, a drive shaft, a substantially vertically disposed reciprocating plate, means operatively connecting the drive shaft to said plate to actuate the latter, a sharpener movably connected to said plate, means operatively connecting the drive shaft to the sharpener to move the latter across the saw, a revoluble cam member, means operatively connecting the cam member to the drive shaft, and a stop operatively connected to the cam member and arranged to engage said plate during the continuous operation of the machine to control the position of the sharpener relative to the saw teeth and to vary the same in accordance with the particular characteristics of the tooth being sharpened.

6. In a machine for sharpening a saw having teeth of variable characteristics including a saw holder, a drive shaft, a substantially vertically disposed reciprocating plate, means operatively connecting the drive shaft to said plate to actuate the latter, a sharpener movably connected to said plate, means operatively connecting the drive shaft to the sharpener to move the later across the saw, a jack shaft, and means operatively connecting the jack shaft to the drive shaft, said jack shaft having a cam bearing against said plate to control the vertical position of the sharpener relative to the saw teeth and to vary the same in accordance with the particular characteristics of the tooth being sharpened.

JOSEPH L. TORGERSON.